United States Patent
Wilson et al.

(10) Patent No.: US 7,757,081 B2
(45) Date of Patent: Jul. 13, 2010

(54) LAUNCHING A SECURE KERNEL IN A MULTIPROCESSOR SYSTEM

(75) Inventors: John H. Wilson, Woodinville, WA (US); Ioannis T. Schoinas, Portland, OR (US); Mazin S. Yousif, Portland, OR (US); Linda J. Rankin, Portland, OR (US); David W. Grawrock, Aloha, OR (US); Robert J. Greiner, Beaverton, OR (US); James A. Sutton, Portland, OR (US); Kushagra Vaid, San Jose, CA (US); Willard M. Wiseman, Vernonia, OR (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 12/005,569

(22) Filed: Dec. 27, 2007

(65) Prior Publication Data

US 2008/0155256 A1 Jun. 26, 2008

Related U.S. Application Data

(62) Division of application No. 10/859,897, filed on Jun. 3, 2004.

(51) Int. Cl.
*G06F 9/30* (2006.01)
*H04L 29/06* (2006.01)

(52) U.S. Cl. ............. 713/162; 713/164; 709/201; 712/28

(58) Field of Classification Search ............. 712/28–30, 712/22, 203; 709/201, 202; 713/164, 162
See application file for complete search history.

(56) References Cited

U.S. PATENT DOCUMENTS

| 5,418,970 A | 5/1995 | Gifford |
| 5,446,856 A | 8/1995 | Baber |
| 5,740,248 A | 4/1998 | Fieres et al. |

(Continued)

FOREIGN PATENT DOCUMENTS

CN 1351297 5/2002

(Continued)

OTHER PUBLICATIONS

Stam, Nick. *Inside Intel's Secretive 'LaGrande' Project.* ExtremeTech.com. Sep. 2003. (http://www.extremetech.com/article2/0,1558,1274119,00.asp).

(Continued)

*Primary Examiner*—Kimyen Vu
*Assistant Examiner*—Edward Zee
(74) *Attorney, Agent, or Firm*—Trop, Pruner & Hu, P.C.

(57) ABSTRACT

In one embodiment of the present invention, a method includes verifying an initiating logical processor of a system; validating a trusted agent with the initiating logical processor if the initiating logical processor is verified; and launching the trusted agent on a plurality of processors of the system if the trusted agent is validated. After execution of such a trusted agent, a secure kernel may then be launched, in certain embodiments. The system may be a multiprocessor server system having a partially or fully connected topology with arbitrary point-to-point interconnects, for example.

21 Claims, 5 Drawing Sheets

U.S. PATENT DOCUMENTS

| | | | |
|---|---|---|---|
| 6,009,488 | A | 12/1999 | Kavipurapu ................ 710/105 |
| 7,121,460 | B1* | 10/2006 | Parsons et al. .............. 235/379 |
| 7,454,749 | B2 | 11/2008 | Oberdorter |
| 7,483,398 | B1 | 1/2009 | Huai |
| 2003/0037222 | A1* | 2/2003 | Emberson et al. ............. 712/11 |
| 2003/0051076 | A1 | 3/2003 | Webber |
| 2003/0084256 | A1 | 5/2003 | McKee |
| 2003/0084346 | A1 | 5/2003 | Kozuch et al. .............. 713/201 |
| 2003/0120935 | A1 | 6/2003 | Teal |
| 2003/0163723 | A1 | 8/2003 | Kozuch et al. .............. 713/200 |
| 2003/0188165 | A1 | 10/2003 | Sutton, II et al. ............ 713/176 |
| 2003/0200405 | A1 | 10/2003 | Willman et al. |
| 2003/0233540 | A1 | 12/2003 | Banerjee |
| 2004/0003321 | A1 | 1/2004 | Glew et al. .................... 714/27 |
| 2005/0028001 | A1 | 2/2005 | Huang |

FOREIGN PATENT DOCUMENTS

| | | |
|---|---|---|
| CN | 1477801 | 2/2004 |
| EP | 0 028 817 | 5/1981 |
| EP | 0 381 645 | 8/1990 |
| EP | 0 794 640 | 3/1999 |
| GB | 2 404 050 | 1/2005 |

OTHER PUBLICATIONS http://www.intel.com/cd/ids/developer/asmona/eng/catalog/19749.htm downloaded Feb. 14, 2005.

English language translation of Japanese Office Action dated Mar. 12, 2007, pp. 1-4.

Examination Report Under Section 18(3) from the The Patent Office of Great Britain dated Dec. 22, 2006, pp. 1-7.

U.S. Patent and Trademark Office, Restriction Requirement dated Nov. 13, 2007 with Response to Restriction Requirement filed on Dec. 12, 2007 in U.S. Appl. No. 10/859,897.

U.S. Patent and Trademark Office, Office Action dated Mar. 18, 2008 with Reply to Office Action filed on Jun. 13, 2008 in U.S. Appl. No. 10/859,897.

U.S. Patent and Trademark Office, Office Action dated Sep. 18, 2008 with Reply to Office Action filed on Nov. 17, 2008 in U.S. Appl. No. 10/859,897.

U.S. Patent and Trademark Office, Office Action dated May 28, 2009 with Reply to Office Action filed on Aug. 28, 2009 in U.S. Appl. No. 10/859,897.

U.S. Patent and Trademark Office, Office Action dated Sep. 16, 2009 with Reply to Office Action filed on Dec. 16, 2009 in U.S. Appl. No. 12/005,455.

U.S. Patent and Trademark Office, Office Action dated Sep. 17, 2009 with Reply to Office Action filed on Dec. 17, 2009 in U.S. Appl. No. 12/005,570.

U.S. Patent and Trademark Office, Office Action dated Jun. 9, 2009 with Reply to Office Action filed on Sep. 9, 2009 in U.S. Appl. No. 12/005,450.

U.S. Patent and Trademark Office, Notice of Allowance and Fee(s) Due dated Dec. 10, 2009 in U.S. Appl. No. 10/859,897.

U.S. Patent And Trademark Office, Notice of Allowance issued Jan. 12, 2010 in U.S. Appl. No. 12/005,450.

U.S. Patent And Trademark Office, Notice of Allowance issued Mar. 22, 2010 in U.S. Appl. No. 12/005,455.

U.S. Patent And Trademark Office, Notice of Allowance issued Mar. 26, 2010 in U.S. Appl. No. 12/005,570.

* cited by examiner

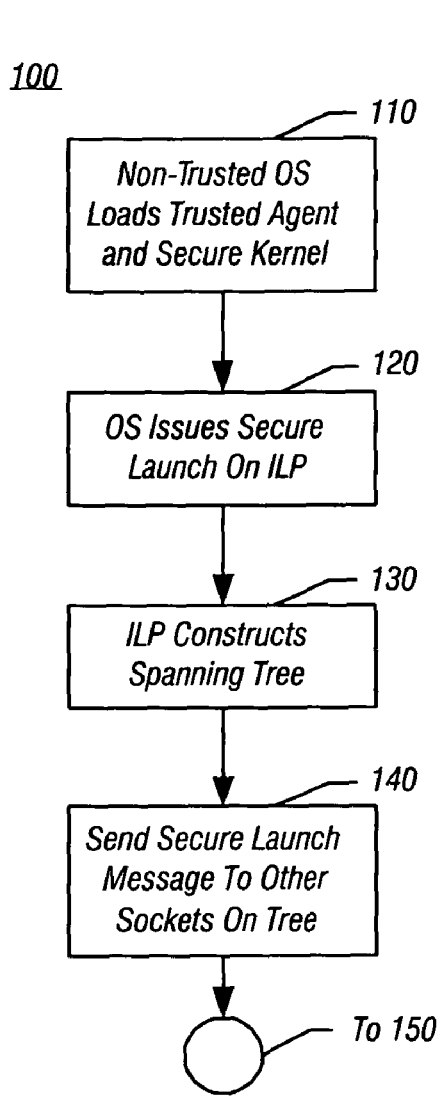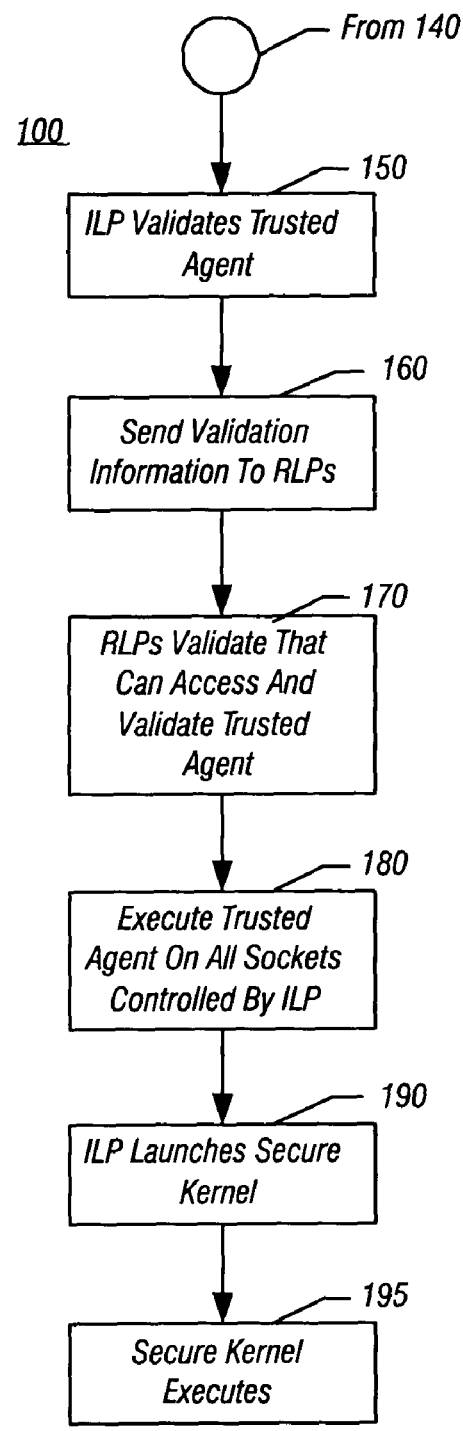
FIG. 1A
FIG. 1B

LAUNCHING A SECURE KERNEL IN A MULTIPROCESSOR SYSTEM

This application is a division of U.S. patent application Ser. No. 10/859,897 filed Jun. 3, 2004 entitled "LAUNCHING A SECURE KERNEL IN A MULTIPROCESSOR SYSTEM," the content of which is hereby incorporated by reference.

BACKGROUND

The present invention relates to computer systems and more particularly to initiating secure operations therein.

A link-based system topology may include multiple nodes connected by point-to-point links. The topology may not be fully connected; that is, a given node may not be directly connected to all other nodes, but any node may reach any other node via multiple links, based on configured routing mechanisms. As examples, the nodes may be a processor, an input/output (I/O) hub, or another such device.

At the outset of system operation, processor hardware is trusted to behave as specified, and link mechanisms are trusted to deliver link-layer messages sent by hardware from one link controller to another link controller. Further, the link mechanisms provide trusted information about the hardware components at each end of a link. Similarly, hardware mechanisms of the I/O hubs are trusted to behave as specified.

In certain implementations, a given protocol running on a system fabric may be used to access memory and maintain a coherent appearance and behavior of the totality of memory as a single physical address space, although separate physical memories may exist. However, this coherent behavior depends on address decoding and routing mechanisms that are configured by untrusted software. Therefore, such a protocol cannot be trusted to access memory correctly until the configuration has been validated. In particular, it cannot be trusted to be free of configuration errors and improper operations, such as memory aliases, or using the same physical address with different mappings. Thus a need exists to initiate a trusted environment in such a system.

BRIEF DESCRIPTION OF THE DRAWINGS

FIG. 1A is a flow diagram of a method in accordance with one embodiment of the present invention.

FIG. 1B is a continuation of the flow diagram of FIG. 1A.

DETAILED DESCRIPTION

Figure 2:
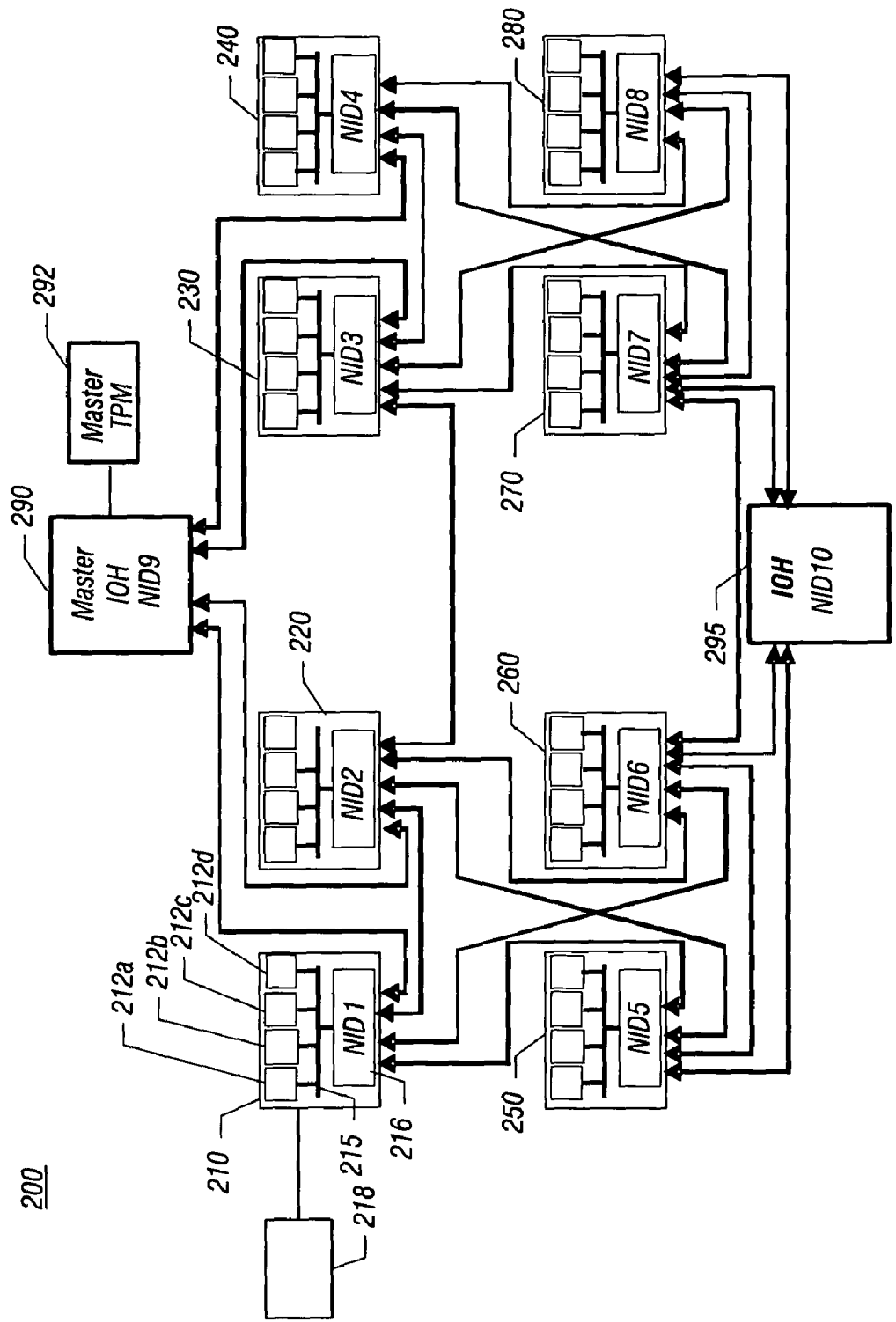
FIG. 2 is a block diagram of a system in accordance with one embodiment of the present invention.

In various embodiments, a secure kernel may be securely launched that runs on all processors in a system topology. Further, an identity of the secure kernel may be measured and recorded in a secure manner, along with one or more software agents used in the launch process. In such manner, a chain of transitive trust rooted in hardware that is used to launch the secure kernel may be recorded.

In certain embodiments, the trusted hardware may include a master I/O hub to which a master trusted platform module (TPM) is attached. A (non-secure) operating system (OS) may have knowledge of this aspect of the topology. Further, a trusted software agent may be executed so that its execution cannot be tampered with in any way.

A user or system administrator may desire to load a secure kernel in a system. As referred to herein, the term "secure" refers to the capability to later inspect the system and determine whether a given kernel was loaded. Further, the user or third party may further determine whether the kernel was loaded into a secure memory environment. Accordingly, in one embodiment, an outside agent may establish trust or decide to trust the kernel contained within the secure environment by being provided the capability to inspect software in the secure environment. In one embodiment, rather than expose the entire region to inspection, a cryptographic hash value (e.g., a software identification value) representing the secure memory region may be inspected. In one embodiment, the digitally signed secure software identification value may be stored in hardware accessible by the outside agent.

Referring to FIG. 1A, shown is a flow diagram of a method of launching a secure kernel on a multiprocessor system in accordance with one embodiment of the present invention. As shown in FIG. 1A, method 100 may begin by loading a trusted agent and a secure kernel into memory (block 110). In one embodiment, a non-trusted OS may load the trusted agent and the secure kernel into a secure region of system memory. The trusted agent and the secure kernel may be stored in a mass storage device, such as a disk drive, and may be loaded into system memory that may be accessed by the multiple processors of the system. In addition, the OS may construct page tables to address the secure kernel and trusted agent. The address and length of these page tables may be stored in special locations in a master I/O hub of the system, in one embodiment. The OS may also store a public key used to authenticate the module. In one embodiment, the trusted agent may be secure authenticated code that is used to validate a configuration of the system, and more specifically, a memory configuration of the system. The trusted agent may be further used to initiate execution of the secure kernel.

Next, the OS may issue a secure launch on an initiating logical processor (ILP) (block 120). Such a secure launch may be a secured enter (SENTER) instruction to initiate a secure enter. Execution of the SENTER instruction may cause the ILP to issue special bus messages both within its socket and other processor sockets, and then wait considerable time intervals for subsequent system actions.

In one embodiment, the ILP may be directly coupled to the master I/O hub, which in turn may be directly coupled to a master TPM. In such an embodiment, the ILP may validate that it has a trusted path to the master TPM. For example, trusted link parameters in the ILP's socket may be examined. Such a path may be a trusted hardware path that does not need to be initialized by firmware or software. At this point in execution of the method, in an embodiment in which the ILP is part of a multiprocessor socket, the ILP may also cause other logical processors (OLPs) in the socket to be halted.

Next, the ILP may construct a spanning tree (block 130). Such a spanning tree may be constructed in accordance with a desired algorithm. The spanning tree may be used to identify all other nodes of the system in relation to the ILP node in a plurality of levels of a tree structure, with the ILP acting as the root of the tree. Nodes directly connected to the ILP may be second level nodes, nodes directly connected to these second level nodes may be third level nodes and so forth. Such a spanning tree may be used to validate the proper configuration of the system and to enable routing of link-based messages to the different nodes. Only trusted hardware and links may be used to construct the spanning tree. In certain embodiments, the spanning tree may provide a trusted broadcast mechanism whereby the ILP can send a message to every processor socket, a means for each processor socket to respond to the broadcast message and for these responses to be summarized as they pass up the tree back to the ILP, and a barrier mechanism to ensure that all processor sockets have reached a known state before the ILP proceeds with a next broadcast message.

Still referring to FIG. 1A, at block 140 a secure launch message may be sent to the other sockets on the spanning tree. In one embodiment, such messages may be sent using a spanning tree protocol that sends messages from the root level to the next level (i.e., to downlink nodes), which in turn sends messages to the next lowest level, and so forth. In response, each level may send response packets back up to its transmitting level (i.e., to uplink nodes). Accordingly, when all the nodes receive the message and respond appropriately, a final summary response packet may be transmitted back to the root node. At this point in execution of the method, a responding logical processor (RLP) on each of the sockets may cause the OLPs on the socket to be halted.

Referring now to FIG. 1B, when the ILP receives the summary response indicating that all other nodes have properly received and responded to the SENTER instruction, the ILP may validate the trusted agent (block 150). Such validation may include, for example, performing a hash computation and comparing the result to a previously stored hash value. Such validation information may then be sent to the RLPs (block 160). The RLPs may each individually validate that it can access the trusted agent in the protected memory location and validate the trusted agent (block 170).

When validation summary responses are received by the ILP for each of the RLPs, the ILP may then control execution of the trusted agent on all sockets of the system (block 180). For example, in one embodiment, the ILP may use barrier mechanisms to initiate portions of the trusted agent, wait for an indication from each socket that it has performed that portion of the trusted agent, and then proceed on to the next portion. Such indications may be sent using the spanning tree protocol discussed above.

The hardware thus uses the spanning tree to launch the identical trusted agent on every processor socket. The trusted agent may execute on every processor socket concurrently in a coordinated single instruction multiple data (SIMD)-type execution. These trusted agent executions conspire to completely validate the memory configuration of the topology, using the spanning tree to coordinate and communicate with the ILP. When the trusted agent successfully validates the configuration, the trusted agent execution on the ILP may validate the page tables used to address the secure kernel, compute the hash of the kernel, and record the hash in the master TPM.

At the conclusion of the execution of the trusted agent, the ILP may launch the secure kernel (block 190). At such time, the secure kernel takes over system operation, and may execute in accordance with the code therein (block 195). For example, the secure kernel may be executed across all sockets of the system.

Referring now to FIG. 2, shown is a block diagram of a system in accordance with one embodiment of the present invention. As shown in FIG. 2, system 200 may be a multi-processor system having an arbitrary, partially connected point-to-point architecture. That is, certain nodes of the system 200 may be directly coupled together, while other nodes may communicate via an intermediate node coupled therebetween. In other embodiments, system 200 may have a fully connected topology. In one embodiment, system 200 may be a simultaneous multiprocessing (SMP) server computer, although the scope of the present invention is not so limited.

That is, while shown in FIG. 2 as a server platform, it is to be understood that in other embodiments, a system may be any one of a desired desktop, mobile, server or other such platform. In certain embodiments, interconnections between different components of FIG. 2 may be point-to-point interconnects that provide for coherent shared memory within system 200, and in one such embodiment the interconnects and protocols used to communicate therebetween may form a common system interface (CSI). In such manner, multiple processors, memories, and other components of system 200 may coherently interface with each other.

In the embodiment of FIG. 2, all components of system 200 may collectively form a coherent system. Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one, some, or all memories associated with system 200 may be reserved for non-coherent transactions. Also, it is to be understood that embodiments of the present invention are not limited to coherent systems.

As shown in FIG. 2, a first processor socket 210 may include a plurality of processing cores 212a, 212b, 212c, and 212d. While shown in the embodiment of FIG. 2 as including four such processing cores, it is to be understood that in other embodiments, processor sockets may include more or fewer such cores. As further shown in FIG. 2, the processor cores may be coupled together via a bus or ring 215. In certain embodiments, such as an embodiment in accordance with a CSI protocol, the processor socket may also include additional logic functionality, such as memory controller functions, and CSI packet generation and routing mechanisms.

As an example, shown in FIG. 2 within processor socket 210 is logic functionality 216, which may include memory controller and other logic functionality. Logic functionality 216 may associate a node identifier (NID) with the processor socket. As shown in FIG. 2, processor socket 210 may have a node identifier of one, indicating in one embodiment that it is the initiating logical processor. Logic functionality 216 may include a source address decoder that maps addresses to corresponding nodes (e.g., NIDs) for all items in a physical memory map. If configured properly, each processor socket may include logic functionality having a source address decoder that corresponds the same addresses to the same nodes. The NIDs, in one embodiment, may be assigned by untrusted firmware upon system initialization, and accordingly, may not be unique. Thus in certain embodiments, a trusted agent may be used to determine whether the NIDs for each of the nodes are in fact unique. In certain embodiments, logic functionality 216 may also include a target address decoder that maps addresses to physical memory, for example, physical memory directly connected to a given processor socket.

A memory 218 may be directly coupled to processor socket 210. While memory 218 may be directly coupled to processor socket 210, it is to be understood that in various embodiments, any of the processor sockets within system 200 may access memory 218. Memory 218 may interface with processor socket 210 using memory controller functionality within logic functionality 216. Further, while not shown in FIG. 2, it is to be understood that each processor socket may have one or more memories associated therewith. While each socket may have a physical memory directly coupled thereto, additional memory elements, such as caches, may be associated with the individual processing cores within the processor sockets. In one embodiment, all memories within a system may be addressed as a single physical address space, although multiple such memories may exist, each directly connected to a different processor socket.

As further shown in FIG. 2, processor socket 210 is directly connected to processor socket 220, processor socket 250, and processor socket 260. Furthermore, processor socket 210 is directly connected to a master I/O hub 290, which in turn is directly coupled to a master TPM 292. While not discussed in detail herein, processor sockets 230, 240, 270 and 280 (and sockets 220, 250 and 260) may have similar processing cores, buses, rings and logic functionality as discussed with regard to processor socket 210. Finally, further shown in FIG. 2 is a second I/O hub 295, which is directly connected to processor sockets 250, 260, 270 and 280.

I/O hubs 290 and 295 may each include a plurality of ports to interface with I/O devices coupled thereto. For example, in certain embodiments, such I/O devices may be devices in accordance with one or more bus schemes. In one embodiment, such I/O devices may be Peripheral Component Interconnect (PCI) Express™ devices in accordance with the Peripheral Component Interconnect Express Base Specification Version 1.0a (published July 2002). Master TPM 292 may be a trusted platform module in accordance with the Trusted Computing Platform Alliance (TCPA) Main Specification Version 1.1b (published Feb. 22, 2002). Master TPM 292 may protect data related to creating and maintaining a secure operating environment. In a particular embodiment, master TPM 292 may include keys for specific encryption, decryption and/or validation processes. Master TPM 292 may also include storage space to hold a digest value and other information to be used in the secure environment. In one embodiment, the storage space in master TPM 292 may include non-volatile memory (e.g., flash memory) to retain its contents in the event of power loss.

While shown in the embodiment of FIG. 2 as including four or five direct connections for each processor socket, other embodiments may have more or fewer direct connections between different sockets. More so, it is to be understood that in different embodiments more or fewer sockets may be present, each having differing numbers of cores and differing amounts of logic functionality. For example, a single processor system may be implemented having a single I/O hub and associated I/O devices coupled thereto. Alternately, a multiprocessor system having a different number of processors (such as 4, 8, 16, or 32) may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Additionally, in certain embodiments, additional components may be present in system 200 such as crossbars, routers and the like.

Figure 3:
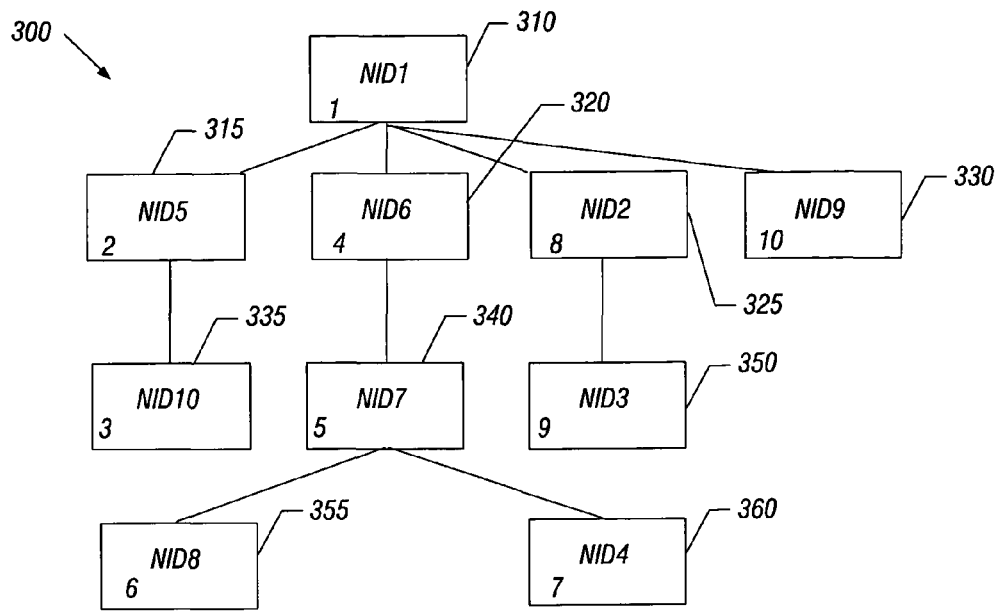
FIG. 3 is a block diagram of a spanning tree constructed in accordance with an embodiment of the present invention.

Referring now to FIG. 3, shown is a block diagram of a spanning tree in accordance with one embodiment of the present invention. As shown in FIG. 3, spanning tree 300 may be a graphical representation of a spanning tree constructed by an ILP. More specifically, spanning tree 300 corresponds to a spanning tree for system 200 of FIG. 2 in which processor socket 210 includes the ILP. Note that each node of the spanning tree has a node identifier corresponding to the node identifier of the matching processor socket of FIG. 2. As shown in FIG. 3, the root level node 310 has a node identifier of 1, corresponding to processor socket 210 of FIG. 2. The level two nodes include the nodes that are directly coupled to processor socket 210. Specifically, as shown in FIG. 3, the level two nodes include nodes 315, 320, 325, and 330, each corresponding to the nodes of system 200 directly coupled to processor socket 210, namely processor sockets 220, 250 and 260, and master I/O hub 290.

A third level of nodes includes nodes 335, 340 and 350. Each of these nodes corresponds to a node directly connected to a second level node. For example, node 335 (e.g., corresponding to I/O hub 295) is directly coupled to processor socket 250; node 340 (i.e., corresponding to processor socket 270) is directly coupled to processor socket 260; and node 350 (i.e., corresponding to processor software 230) is directly coupled to processor socket 220. Finally, a fourth level of nodes includes nodes 355 and 360, both of which are directly coupled to a third level node, namely node 340.

Thus a spanning tree identifies the number of participating sockets within a system. Each socket in the system (except the root socket) may have one link identified as an uplink. Broadcast messages generated by the ILP may be received by an RLP from its uplink. Further, all sockets, except for those that are leafs (e.g., the fourth level nodes of FIG. 3) may have links identified as downlinks. Each socket may propagate broadcast messages to their downlinks. In certain embodiments, a lookup table or other data structure corresponding to the graphical representation shown in FIG. 3 may be stored in a memory associated with processor socket 210 for use by the ILP.

Thus at the end of construction of the spanning tree, the spanning tree includes information regarding the number of nodes and the levels thereof. At the conclusion of spanning tree enumeration, unique identifiers may be assigned to each of the nodes, and a count of nodes below a given node may also be determined and stored. Thus as shown in FIG. 3, in addition to the node identifiers (also shown in FIG. 2) for each of the nodes, an additional spanning tree unique identifier may be present (e.g., node ID one has a spanning tree identifier of one, whereas node ID 5 has a spanning tree identifier of two).

Figure 4:
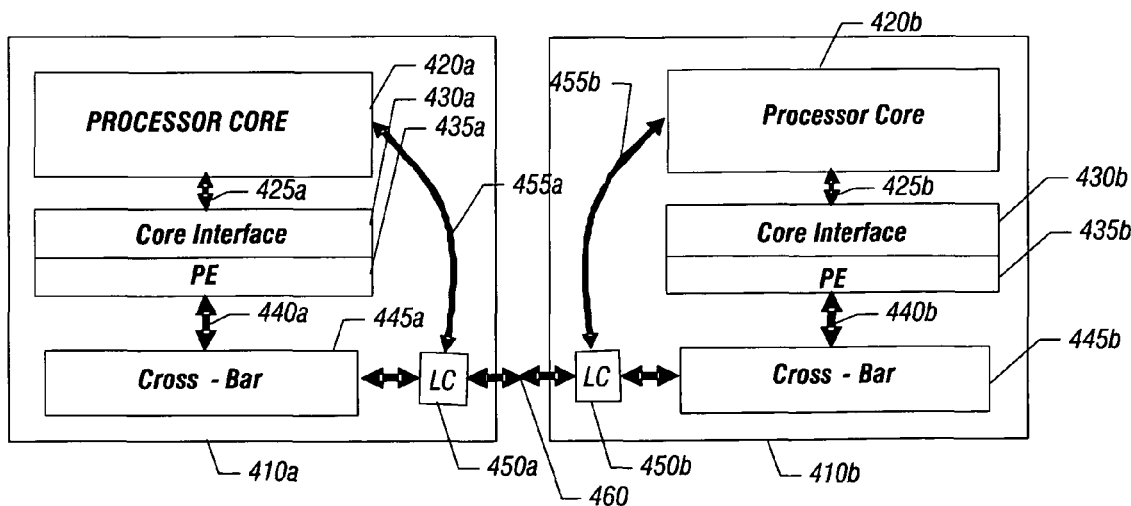
FIG. 4 is a block diagram of a trusted hardware link in accordance with an embodiment of the present invention.

Referring now to FIG. 4, shown is a block diagram of trusted link hardware in accordance with one embodiment of the present invention. Such trusted link hardware may be used to provide a trusted hardware link within a processor socket for use prior to completion of execution of a trusted agent. Such a trusted hardware link may be trusted, as no firmware or software is needed for operation and transmission of messages along the link. Trusted link hardware 455a and 455b may be contained within a processor socket (i.e., sockets 410a and 410b). While two such sockets are shown in FIG. 4, socket 410a and its components will be discussed herein. As shown in FIG. 4, hardware link 455a may be coupled between a processor core 420a and a link controller 450a. Using trusted hardware link 455a, trusted link messages may be sent and received from core 420a without relying on software or firmware.

In contrast, for normal system messaging and packet transmissions, link-based messages travel to/from core 420a via a bus or ring 425a through a core interface 430a and a protocol engine 435a. In one embodiment, protocol engine 435a may be a CSI protocol engine to format data and messages into CSI packets. Further, a bus 440a couples protocol engine 435a through a crossbar 445a. From there, data and messages may be sent to other nodes, memory associated with the processor socket, to link controller 450a, or other desired locations.

Because the components including core interface 430a, protocol engine 435a, and crossbar 445a are set up by untrusted firmware, this path may not provide a non-spoofable access path prior to complete execution of a trusted agent. Thus in various embodiments, hardware link 455a may provide a non-spoofable access path between core 420a and link controller 450a, which is particularly suited for use prior to validation of the system by a trusted agent. For example, prior to validation, link controllers, such as link controllers 450a and 450b may be used to generate link messages using a special instruction from a core. A receiving link controller may thus capture link message content and make it directly available to a processor core via a trusted hardware link, such as trusted hardware link 455a. In certain embodiments, an event mechanism from a link controller to a processor core may occur so that microcode in the core may be informed of the arrival of new link messages on the trusted hardware link. During link initialization, information regarding neighboring nodes may be captured by a link controller and may be available to both protocol engine and the processor core. In such embodiments, such information may include a node type and a node identifier for the neighboring nodes.

As further shown in FIG. 4, corresponding components to those discussed above with regard to processor socket 410a may be found in processor socket 410b. Furthermore, a trusted link between the two processors maybe effected via a hardware link 460 coupled between link controller 450a and link controller 450b. This trusted link may be used to send link-based messages between processor sockets prior to validation of the system by a trusted agent.

Figure 5:
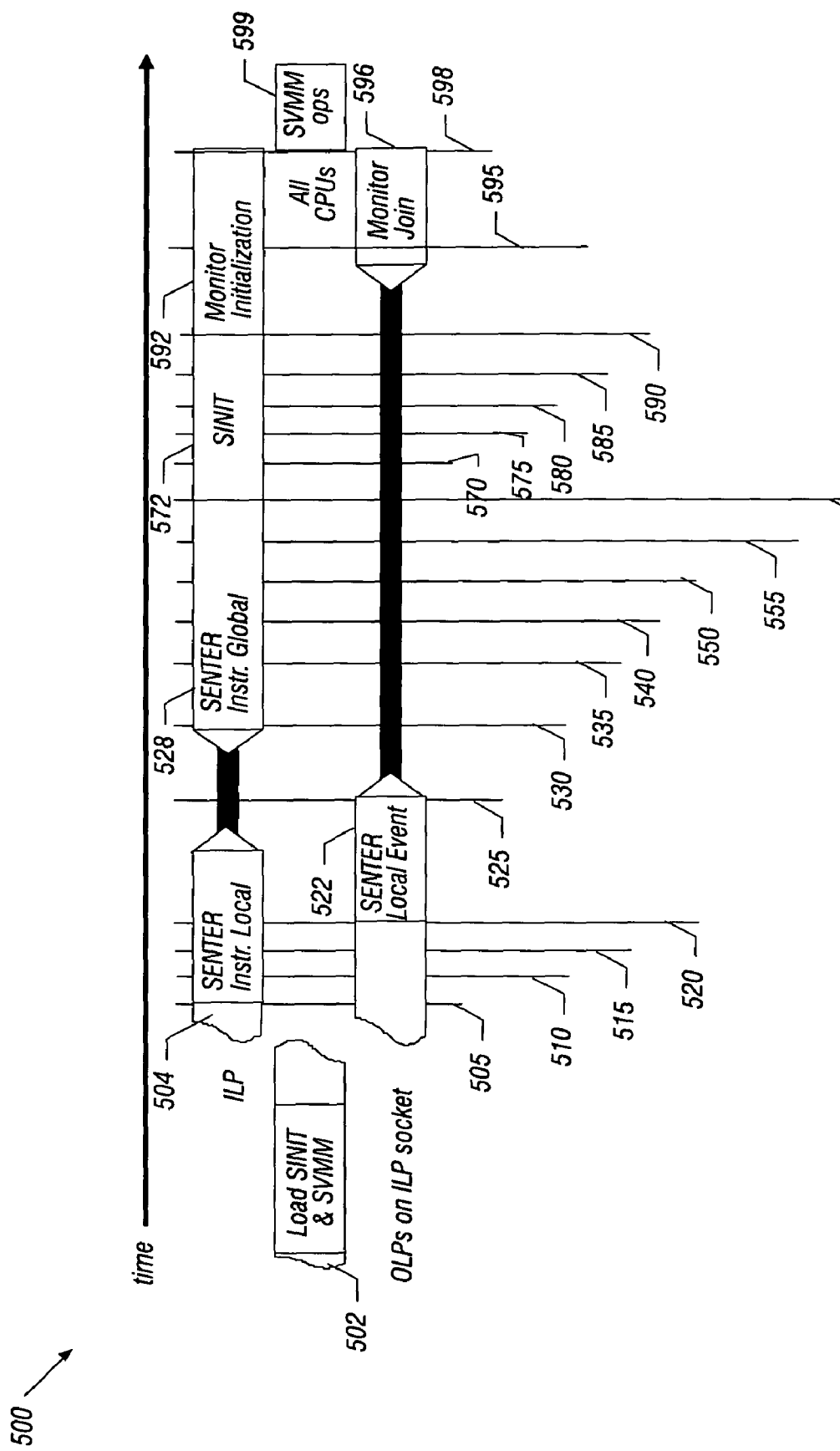
FIG. 5 is a timing diagram of a secure launch in accordance with one embodiment of the present invention as viewed by an initiating logical processor.

Referring now to FIG. 5, shown is a timing diagram of a secure launch in accordance with one embodiment of the present invention, as viewed by the ILP. As shown in FIG. 5, secure launch 500 begins by loading a trusted agent and a secure kernel into memory (segment 502). As discussed above, in one embodiment a non-trusted OS may perform such loading operations. Then a SENTER instruction may be sent to a processor socket including a desired ILP (segment 504). For example, such an instruction may be issued by a non-trusted OS.

When the ILP receives the SENTER instruction, it may issue a similar instruction to other logical processors within its socket and also to other processor sockets, and more specifically to a responding logical processor (RLP), of which there may be one in each processor socket (time 505). The determination of which logical processor may be the ILP and/or RLP may vary in different embodiments, and may be based on a software or firmware determination. For example, in one embodiment the ILP may be chosen by an OS. Further, the RLP within other processor sockets may be chosen by all the logical processors in a given socket. At time 510, the ILP may verify that it is directly connected to the master I/O hub. Then at time 515, the ILP may broadcast a SENTER bus message to the OLPs within its socket, and each OLP may respond to the SENTER instruction (time 520).

At this time, a SENTER local event (segment 522) may begin. At time 525, each OLP may issue an acknowledgment (ACK) and enter a wait state. Such a wait state may be maintained by the OLPs until later commanded to leave the wait state by the ILP.

Then a SENTER global instruction phase (segment 528) may be entered. First, the ILP may send a message seeking acknowledgement (ACK) from the nodes within the system. When ACKs are received by the ILP, it may send a continue instruction (time 530). At this time, the ILP may construct a spanning tree.

While construction of a spanning tree may take different forms, in one embodiment a spanning tree may be constructed by sending pulses that are link-level messages broadcast down the tree to a next lower level, and receiving returns, which are link-level messages containing accumulated results back up the tree. In such manner, each RLP that receives a pulse message may forward it to its downlinks, and receive return messages therefrom. The spanning tree link-based message that is sent may cause each socket to set a level for each of the sockets. Then, spanning tree enumeration may occur in which a unique identifier may be assigned to each node. Accordingly, upon completion of the spanning tree, each socket is assigned a unique identifier and a level, further indicating its relative location with respect to the ILP and uplink and downlink connections to/from the socket.

Upon validation and completion of the spanning tree, the ILP may send the SENTER instruction to all other processor sockets (time 535). Next, the ILP may merge a summary response received from nodes on the spanning tree (time 540). An algorithm over the tree verifies that the software configuration of the topology has given each node a unique identifier that may be used in a routing protocol of the system.

Then the ILP may measure (i.e., compute the hash) and authenticate (i.e., verify a signature) the trusted agent that it finds at the designated address in the master I/O hub and broadcast the hash value, base address and length of the trusted agent, and a hash of the public key used to verify the signature to the other processor sockets (time 550). Such a broadcast may occur using the spanning tree protocol. When the other sockets validate the trusted agent, they will send response messages that are then merged by the ILP at time 555. If every socket sends a positive response, the ILP may load, record the hash of the trusted agent (e.g., in the master TPM) and launch the trusted agent at time 560. If one or more sockets fail to respond positively, the secure launch may be terminated, in certain embodiments. In the embodiment shown in FIG. 5, the trusted agent may be a secure trusted agent (e.g., entitled SINIT-AC, for a secure initialization-authenticated code), although the scope of the present invention is not so limited.

Then the trusted agent may be executed (segment 572). In one embodiment, execution of the trusted agent may occur in a loosely lock-step SIMD execution. That is, the same trusted agent may execute on all sockets, synchronized at particular barriers within the code. For example, the ILP may issue a broadcast message including an opcode and data on all links. Each RLP may get the data and forward the message to its downlinks, if any, and process the data. If the RLP is a leaf, it may send a response message back up to its uplink. If the RLP is an intermediate node, it may wait for all responses from its downlinks, summarize all response data using opcodes, and send a summarized response to its uplink. When finally the ILP obtains a summarized response from all other sockets, execution may continue in similar manner to a next barrier position.

During execution, the trusted agent may validate the local configuration and source address decoder on each processor socket (time 570). Further, the trusted agent may validate the uniqueness of each of the node identifiers for each processor socket (time 575). For example, the trusted agent may cause the source address decoders to be sent to the ILP (time 580). Then the ILP may merge and analyze the results of a comparison of source address decoders (time 585). Then, the trusted agent may terminate by validating, loading, recording and launching the secure kernel (time 590). Such validation information (e.g., a hash value) may be stored in a master TPM, in certain embodiments. In one embodiment, the secure kernel may be a secure virtual machine monitor (SVMM), although the scope of the present invention is not so limited.

Still referring to FIG. 5, monitor initialization (segment 592) may cause the ILP to wake up all processor cores in all sockets with a special instruction to cause all processors to exit their waiting state. Thus at segment 596 all monitors join and at time 598 all processor cores are participating and secure kernel operations may begin (segment 599).

Figure 6:
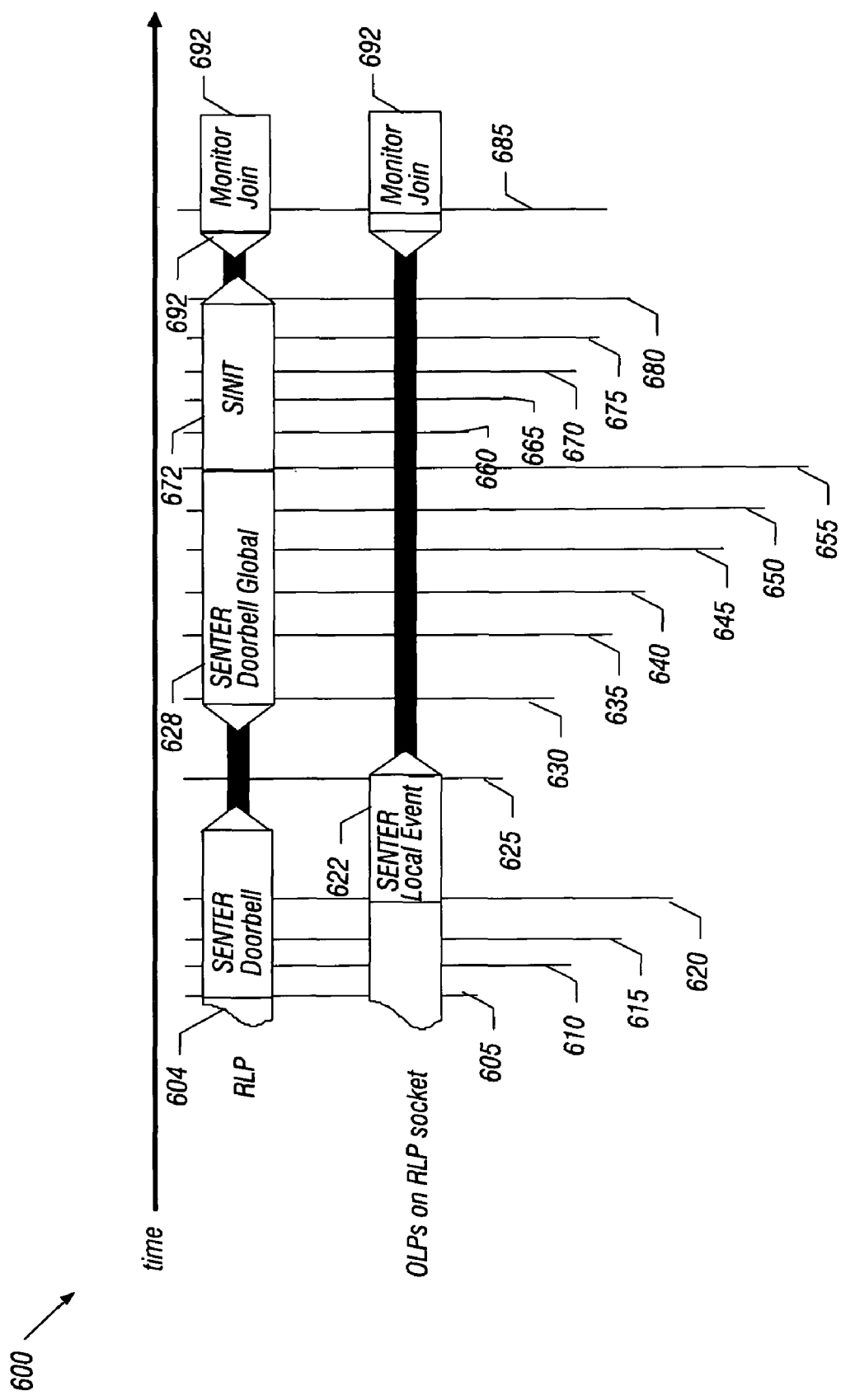
FIG. 6 is a timing diagram of a secure launch in accordance with one embodiment of the present invention as viewed by a responding logical processor.

Referring now to FIG. 6, shown is a timing diagram of a secure launch in accordance with one embodiment of the present invention. More specifically, FIG. 6 shows the timing of a secure launch as viewed by a responding logical processor (RLP). Thus the secure launch 600 seen in FIG. 6 corresponds closely to that occurring in the timing diagram of FIG. 5. First, a SENTER doorbell event occurs (segment 604). During such an event, the RLP is interrupted by the SENTER doorbell instruction from the ILP (time 605). Then at time 610, the RLP sends a SENTER downlink message to its downlink nodes (if any). At time 615, the RLP broadcasts the SENTER message to all processors (i.e., OLP's) within its socket. Each of the other logical processors in the socket may respond to the SENTER cycle (time 620). Then a SENTER local event (segment 622) occurs, in which each OLP issues an ACK back to the ILP and the OLPs enter a wait state (at time 625).

Then at segment 628, a SENTER doorbell global event occurs. When all ACKs from downlink nodes are received by the RLP, it sends a continue message to the ILP (time 630). The RLP merges such continue messages at time 635. Then at time 640, the RLP may receive validation information from the ILP. In one embodiment, the ILP may send information regarding the trusted agent hash value, base, size, and public key hash. Further at this time, the RLP may forward this information to its downlinked nodes. At time 645, the RLP may compare the hash received to its hash of the trusted agent.

At time 650, the RLP receives validation messages from its downstream nodes and merges those results. Also, the RLP sends a summary response up through its upstream node to the ILP. Then based on information received from the ILP, the RLP loads, authenticates, checks the signature of the trusted agent, and launches the trusted agent (time 655).

If all processor sockets reach this point, the trusted agent executes (segment 672). Specifically, the trusted agent validates the local configuration and node IDs of each processor socket (time 660), and checks and validates the source address decoder within the sockets (times 665 and 670). The RLP may receive results of this validation from downlink sockets and merge and send the results up to its uplink processor or the ILP (time 675). Then the RLP socket enters a special wait state (at time 680).

At this point, the secure kernel is launched, first on the ILP socket (segment 692). Then at time 685, the secure kernel on the ILP wakes up all processor cores on all sockets with a special wake instruction. At this time, the secure kernel may continue its execution on some or all of the processors of the system. For example, following the secure launch, a virtual machine environment may be created in which the SVMM may operate as the most privileged code within the system, and may be used to permit or deny direct access to certain system resources by the OS or applications within virtual machines.

In such manner, embodiments of the present invention may record and launch a trusted secure kernel on an arbitrarily complex server hardware topology that has been configured by untrusted software and firmware. The kernel may then proceed to construct, record and attest to a trusted server execution environment. Further, in certain embodiments, a trusted agent may be executed in SIMD-style on all processor sockets in a server topology, and by using a trusted barrier/broadcast mechanism, the configuration of an arbitrarily complex server topology may be validated, and by transitive trust from hardware through the trusted agent, a secure environment can be recorded and launched.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   verifying an initiating logical processor of a system;
   validating a trusted agent with the initiating logical processor if the initiating logical processor is verified including measuring and authenticating the trusted agent at a predetermined address, broadcasting information to enable a plurality of processors of the system to validate the trusted agent, and thereafter validating the trusted agent with the plurality of processors of the system using the broadcasted information; and
   launching the trusted agent on the plurality of processors of the system if the trusted agent is validated.

2. The method of claim 1, further comprising storing address information of the trusted agent in a protected portion of a master hub agent of the system.

3. The method of claim 1, further comprising constructing a spanning tree across the plurality of processors.

4. The method of claim 3, further comprising using the spanning tree to launch the trusted agent on the plurality of processors.

5. The method of claim 1, further comprising executing the trusted agent using a barrier mechanism.

6. The method of claim 5, further comprising executing a secure kernel after executing the trusted agent.

7. The method of claim 1, further comprising executing the trusted agent on the initiating logical processor and the plurality of processors in a coordinated single instruction multiple data (SIMD) execution to validate a memory configuration of the system.

8. The method of claim 7, further comprising validating page tables used to address a secure kernel using the initiating logical processor, and concluding execution of the trusted agent.

9. The method of claim 8, further comprising thereafter launching the secure kernel first on the initiating logical processor, sending a wake instruction from the initiating logical processor to the plurality of processors and continuing execution of the secure kernel on the plurality of processors.

10. An article comprising a non-transitory machine-accessible medium including instructions that when executed cause a system to:

verify an initiating logical processor of the system;

validate a trusted agent with the initiating logical processor if the initiating logical processor is verified including measuring and authenticating the trusted agent at a predetermined address, broadcast information to enable a plurality of processors of the system to validate the trusted agent, and thereafter validate the trusted agent with the plurality of processors of the system using the broadcasted information; and launch the trusted agent on the plurality of processors of the system if the trusted agent is validated.

11. The article of claim 10, further comprising instructions that when executed enable the system to store address information of the trusted agent in a protected portion of a master hub agent of the system.

12. The article of claim 10, further comprising instructions that when executed enable the system to execute the trusted agent using a barrier mechanism.

13. The article of claim 12, further comprising instructions that when executed enable the system to execute a secure kernel after executing the trusted agent.

14. The article of claim 10, further comprising instructions that when executed enable the system to execute the trusted agent on the initiating logical processor and the plurality of processors in a coordinated single instruction multiple data (SIMD) execution to validate a memory configuration of the system.

15. The article of claim 14, further comprising instructions that when executed enable the system to validate page tables used to address a secure kernel using the initiating logical processor, conclude execution of the trusted agent, and thereafter launch the secure kernel first on the initiating logical processor, send a wake instruction from the initiating logical processor to the plurality of processors and continue execution of the secure kernel on the plurality of processors.

16. A system comprising:
  a plurality of processors, wherein one of the plurality of processors comprises an initiating logical processor;
  a storage medium coupled to the plurality of processors including instructions that when executed enable the system to verify the initiating logical processor, validate a trusted agent with the initiating logical processor if the initiating logical processor is verified including measuring and authenticating the trusted agent at a predetermined address, broadcast information to enable a plurality of processors of the system to validate the trusted agent, validate the trusted agent with the other ones of the plurality of processors using the broadcasted information, and launch the trusted agent on the plurality of processors if the trusted agent is validated.

17. The system of claim 16, further comprising a master hub agent coupled to one of the plurality of processors, wherein the instructions further enable the system to store address information of the trusted agent in a protected portion of the master hub agent.

18. The system of claim 17, wherein the instructions further enable the system to construct a spanning tree across the plurality of processors and use the spanning tree to launch the trusted agent on the plurality of processors.

19. The system of claim 18, wherein the instructions enable the system to execute the trusted agent using a barrier mechanism and execute a secure kernel after execution of the trusted agent.

20. The system of claim 16, wherein the storage medium further comprises instructions that when executed enable the system to execute the trusted agent on the initiating logical processor and the plurality of processors in a coordinated single instruction multiple data (SIMD) execution to validate a memory configuration of the system.

21. The system of claim 20, wherein the storage medium further comprises instructions that when executed enable the system to validate page tables used to address a secure kernel using the initiating logical processor, conclude execution of the trusted agent, and thereafter launch the secure kernel first on the initiating logical processor, send a wake instruction from the initiating logical processor to the plurality of processors and continue execution of the secure kernel on the plurality of processors.

* * * * *